Nov. 26, 1968   R. JÖTTEN ET AL   3,413,544
TIME INTERVAL MEASURING DEVICE
Filed Feb. 9, 1966   2 Sheets-Sheet 1

Inventors:
Robert Jötten & Jorck Rogowsky
By: Spencer & Kaye
Attorneys

United States Patent Office 3,413,544
Patented Nov. 26, 1968

3,413,544
TIME INTERVAL MEASURING DEVICE
Robert Jötten, Darmstadt, and Yorck Rogowsky, Berlin, Germany, assignors to Licentia Patent-Verwaltungs-G.m.b.H., Frankfurt am Main, Germany
Filed Feb. 9, 1966, Ser. No. 526,257
Claims priority, application Germany, Feb. 12, 1965, L 49,954
13 Claims. (Cl. 324—68)

ABSTRACT OF THE DISCLOSURE

A device for providing an indication of the duration of each of several successive periodic time intervals including a plurality of integrators each providing an output whose amplitude is proportional to a respective time interval and means for placing each integrator in succession into operation during a respective successive time interval and for resetting each integrator output to zero upon termination of the integration of any of the other integrators, and means for registering the largest integrator output obtained during each periodic time interval.

---

The present invention relates generally to measuring devices and more particularly to a measuring arrangement for registering the duration of several successive periodic intervals of time.

It is generally known to provide measuring arrangements for the registration of time intervals wherein the measured value is based upon the average value of a sequence of voltage pulses or the average value of a voltage block whose amplitude is constant but whose length is variable. In both such arrangements, only a delayed measure of the register value is obtained because the average value of the voltage level must first be formed, and thus such arrangements do not provide a rapid determination of the value and the delay results in disadvantages in many applications of such arrangements.

It is therefore an object of the present invention to provide a measuring arrangement for registering the duration of several successive periodic intervals of time and which overcome the disadvantages of the prior art arrangements.

It is another object of the present invention to provide a measuring arrangement which indicates the duration of several successive periodic intervals of time without delay.

It is a further object of the present invention to provide a measuring arrangement for indicating the duration of a time interval wherein the amplitude of the output signal is directly proportional to the length of the time interval.

According to the present invention, the disadvantages of the prior art arrangements are avoided by providing a circuit arrangement which registers the beginning and the end of each interval of time and which is supplied with a start and a stop signal. The measuring arrangement of the present invention includes a plurality of units each having an integrator circuit therein which is fed by a constant amplitude signal and which integrates the signal. The start signal begins the integration of one of the units and the stop signal ends the integration of such unit with the integrated signal being stored while the stop signal simultaneously causes the integrators of the other units to be set to zero and which integrators are activated in turn. The measuring arrangement is further provided with a registering member which indicates, during the time in which the amplitudes of the output signals of the two integrators are larger than zero, the integrated signal having the greater amplitude.

According to a feature of the present invention, at the end of each interval of time, the resultant signal level of the intergration corresponds to the duration of the time interval because the resultant level is directly proportional to the length of the time interval, provided the amplitude of the signal fed to the integrator is maintained constant during the integration. In accordance with a further feature of the present invention, only two units are required for measuring the duration of an even number of time intervals per period, whereby in the order of the signal transmission, the integation start signal generators are connected to the activation input of the first or second unit and the corresponding integration stop signal generators are connected to the corresponding de-activation input of the first or second unit.

The arrangement of the present invention may be used advantageously for indicating the conduction cutoff angle of inverters which are fed by mains, for indicating rotating field angles of single or poly-phase synchronous machines, for indicating electrical phase displacement, or for indicating torsion angles of rotating bodies.

Additional objects and advantages of the present invention will become apparent upon consideration of the following description when taken in conjunction with the accompanying drawings in which.

Figure 1:
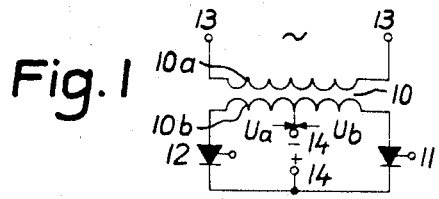
FIGURE 1 is a schematic view of a current converting circuit.

Referring now to the drawings, there is shown in FIGURE 1 a current converting circuit comprising two controlled current rectifiers 11 and 12, each having a control input, and a current rectifier transformer 10 which is fed by an A.C. current supply at terminals 13 of the transformer. The transformer includes a primary winding 10a and a secondary winding 10b which is provided with a center tap. A load or a D.C. current supply may be connected to the terminals 14, one of the terminals being the center tap for the secondary winding. For the sake of clarity, the present invention will be described on the basis of the converting circuit of FIGURE 1 with respect to the indication of the conduction cutoff phase angle of the main fed inverters.

FIGURE 2 shows an output wave form for the two phase voltages $U_a$ and $U_b$, with $U_a$ being shown in solid line and $U_b$ in dashed line. The hatched area within the curves, corresponds to the blocking voltage wave form for the two controlled current rectifiers 11 and 12 with the wave form for voltages $U_{11}$ and $U_{12}$ being shown in FIGURE 2c. In FIGURE 2b, there is shown the current wave form $i_{11}$ and $i_{12}$ for the current rectifiers, with current $i_{11}$ being shown in dashed line and current $i_{12}$ shown in solid line. The interval between the end of the period of conduction of a current rectifier and the positive blocking voltage for such rectifier is termed the conduction cutoff phase angle and is designated by $\delta$ in FIGURE 2c.

Figure 3:
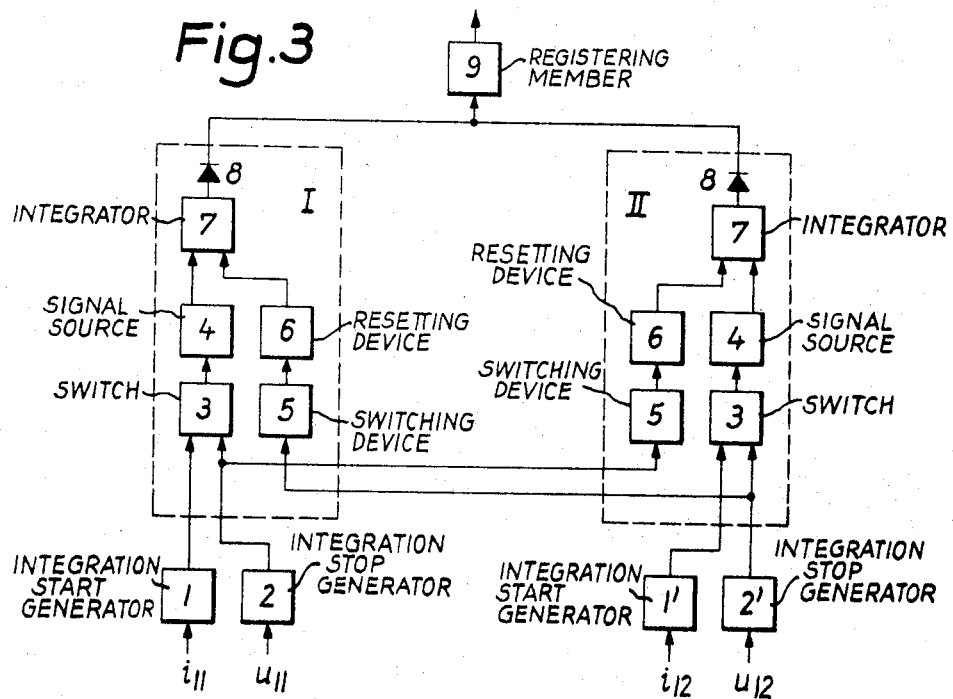
FIGURE 3 is a schematic view of the circuit arrangement for indicating the conduction cutoff phase angle of the main fed inverters of the circuit of FIGURE 1.

In FIGURE 3 there is shown the circuit arrangement of the present invention for indicating the conduction cutoff phase angle of the current converting circuit of FIGURE 1. The circuit arrangement comprises two units I and II, each having an electronic switch 3 with two inputs and a single output, whereby one of the inputs activates the output signal and the other input de-activates the output signal. The switch 3 is connected to a source 4 for delivering a constant amplitude auxiliary signal, for example, a constant current signal to an integrating circuit 7. Each unit also includes a switching device 5 for activating a resetting circuit 6 which resets the integrator circuit 7 to zero. The integrator circuit 7 is connected to a diode 8 which serves as a decoupling member and each of the diodes 8 is connected to a registering member 9. As is further shown in FIGURE 3, each of the switches 3 are fed by signal generating means 1 and 2 for unit I and 1' and 2' for unit II. The generating means 1 and 2 cooperate with the rectifier 11 with means 1 being activated when the rectifier current $i_{11}$ decays to zero indicating that rectifier 11 is non-conductive. The generating means 1 may also be responsive to the anode-cathode voltage of the rectifier 11 when the rectifier becomes non-conductive for generating an output signal. The generating means 2 may be activated by the zero crossing of the blocking voltage, that is, when the blocking voltage for the rectifier 11 becomes positive. The means 1' and 2' operate in a similar manner in conjunction with the rectifier 12.

Figure 2A:
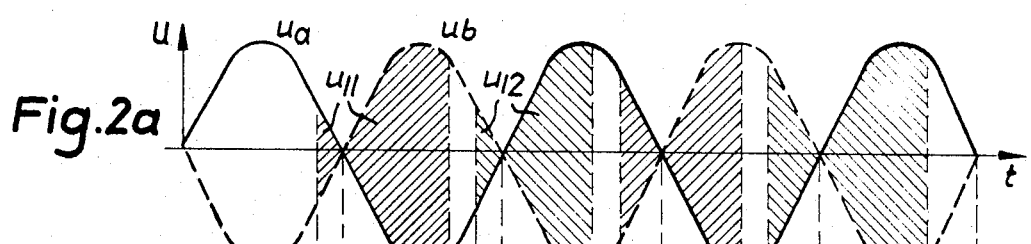
FIGURES 2a to 2c illustrate curves of the current and voltage wave forms for the current converting circuit of FIGURE 1.
Figure 2B:
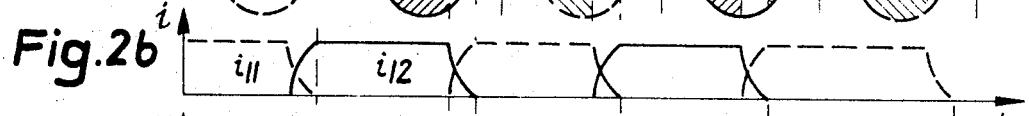

The operation of the measuring arrangement is essentially as follows: When the rectifier current $i_{11}$ becomes zero, thereby denoting the beginning of the measured interval, the means 1 transmits an integration start signal which is fed to the activating input of the electronic switch 3 of unit I. The output of this switch activates source 4 which delivers a constant amplitude signal such as a constant current to the activating input of the integrator 7 whereby the timely integration of the current signal begins with the integration circuit 7 providing an integrated output signal, for example, a D.C. voltage signal which is proportional to the integration time. This output signal is fed via the diode 8 to the registering member 9. The output wave form for the current $i_{11}$ is shown in FIGURE 2b with the integration start signal being generated when the current $i_{11}$ becomes zero, which point is marked by a vertical dashed line.

Figure 2C:
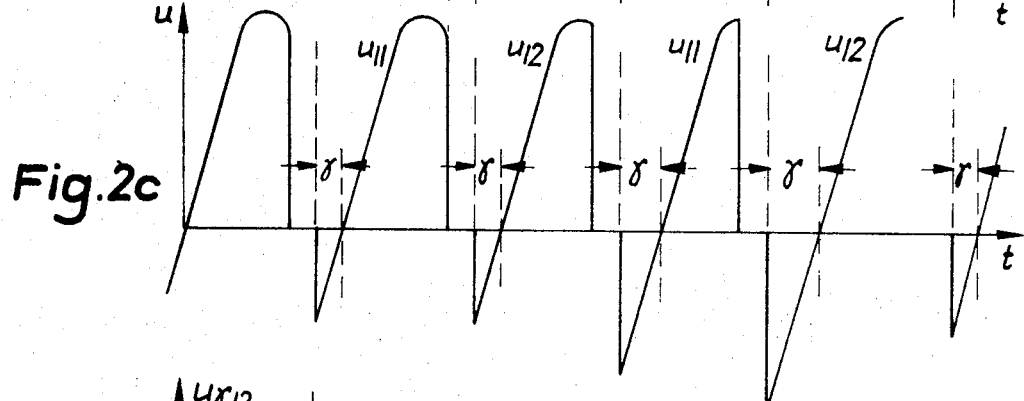
Figure 2D:
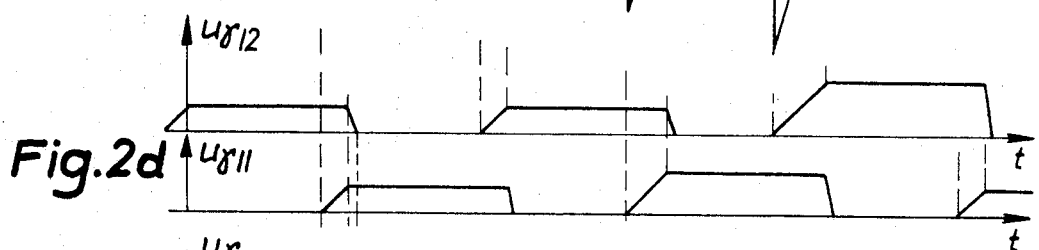
FIGURE 2d illustrates the output wave forms for the integrator circuits of FIGURE 3.

The generating means 2 is activated when the blocking voltage for the rectifier 11 becomes positive as shown in FIGURE 2c and delivers an integration stop signal to the de-activating input of the switch 3. Thus, the output signal from the switch 3 is de-activated and the source 4 no longer delivers the output signal to the integrator circuit and the integration of this signal is ended. The amplitude of the output signal of the integrator does not change, however, and the resultant signal is stored. As shown in FIGURE 3, the switching device 5 of the unit II is connected to the de-activating input of the switch 3 of unit I and therefore the integration stop signal transmitted by signal generator 2 is also delivered to the input of the switching device 5 of the unit II. Thus, while the integrator circuit 7 of the unit I terminates integration, the switching device 5 activates the resetting circuit 6 which is connected to the zero setting input of the integrator 7 of the unit II and resets the output signal of such integrator to zero. Accordingly, the output signal of the unit II is reset to zero and the output signal of the unit I remains equal to the stored value. The output wave forms of the integrators are shown in FIGURE 2d while the output wave form of the registering member 9 is shown in FIGURE 2e.

When the rectifier current $i_{12}$ becomes zero, the integrator 7 of the unit II begins integration in the manner similar to that described above and the integrator delivers an output having a linearly-increasing value. When the blocking voltage of the rectifier 12 becomes positive, an integration stop signal is generated by the generating means 2', thereby terminating the integration and simultaneously causing the resetting of the output signal of the integrator 7 of the unit I to zero. Since each of the outputs of the integrator 7 are connected to the registering member 9, this member indicates the output signal having the higher amplitude of the signals delivered by each unit.

Figure 2E:
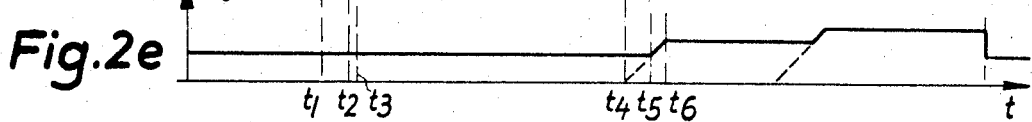
FIGURE 2e illustrates the output wave forms for the registering member of FIGURE 3.

Thus, as is shown in FIGURE 2e, at time $t_1$, the rectifier current $i_{11}$ decays to zero so that the integration is started by a signal from the signal generator 1. The output wave form $U_{611}$ for the integrator 7 of the unit I increases linearly, as shown in the bottom portion of FIGURE 2d, until the integration is ended at time $t_2$ which represents the time at which the blocking voltage $U_{11}$ becomes positive and causes the integration stop signal to be generated by the generator 2. Simultaneously, the stored output signal $U_{612}$ shown in the upper portion of FIGURE 2d, which is the output signal for the integrator 7 of the unit II, is rest to zero. The output wave form $U_6$, shown in FIGURE 2e, for the registering member 9 remains constant because the amplitudes of the output signals of the units I and II do not differ from each other. However, when the conduction cutoff phase angle changes which is denoted by the interval between the de-activation of the rectifier as its current signal decays to zero and the blocking voltage of this rectifier becoming positive, the amplitude of the output signal of the registering member 9 also changes. As is shown in FIGURE 2, at the time $t_4$, the integrator 7 of the unit I again begins to integrate and provides a linearly-increasing output wave form. Since the conduction cutoff phase angle δ has increased, the integration is over a longer period of time and the amplitude of the output signal of the integrator 7 of the unit I becomes correspondingly greater. At time $t_5$, the amplitude of the integrator output signal of the unit I becomes larger than that of unit II so that the registering member 9, beginning at $t_5$, starts to register the higher amplitude integrator output signal that is the signal from unit I. At time $t_6$, the integration is again ended and the integrator output signal $U_{612}$ for the unit II is reset to zero.

It should be noted that although the measuring arrangement has been described for use with the circuit shown in FIGURE 1, if a different current converting circuit is used, the measuring arrangement may be slightly modified. Also, if the current converting circuit has an even number of current rectifiers, such as in a three-phase bridge circuit, the signal generators 1 and 2, 1' and 2', respectively, are connected in parallel with additional signal generators. These generators are so connected that the activation sequence of their signal transmission is such that each of the generators cooperates with the units I and II. In the case of a three-phase bridge circuit, this would result in all of the signal generators of one bridge half cooperating with a common unit.

If a current converting circuit is provided with an odd number of current rectifiers, for example, a three-phase star circuit, and thus an odd number of intervals per period, a separate unit must be provided for each current rectifier, which unit is connected to the signal generators of the corresponding current rectifier. At the same time, the de-activating inputs for the electronic switch 3 of the individual units have to be connected to the switching device 5 of the other units and the integration stop signal generators must be so connected that the generator does not effect the switching device of its own unit and is isolated therefrom and this isolation may be achieved by providing diodes in the circuit.

Figure 4:
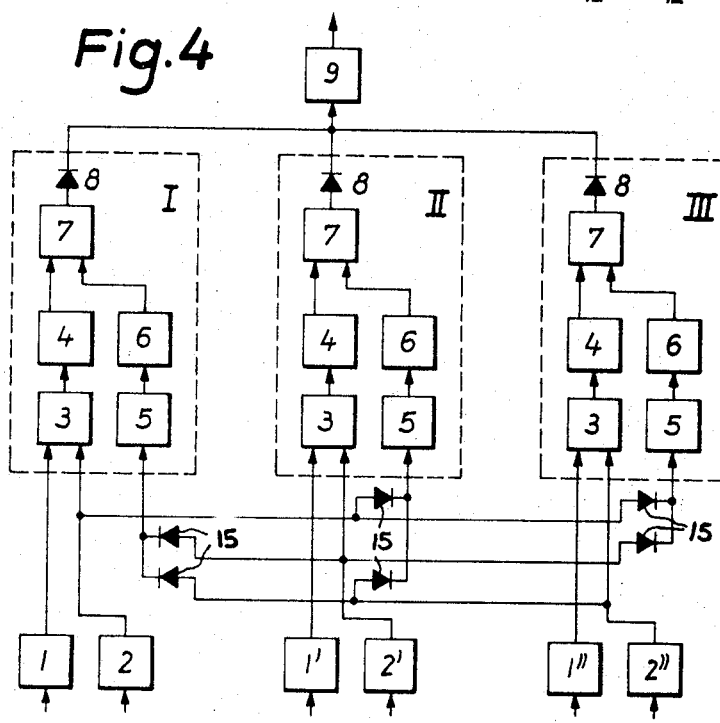
FIGURE 4 is a schematic view of the circuit arrangement for indicating the conduction cutoff phase angle of the main fed inverters of the three-phase star circuit type.

In FIGURE 4 there is shown the circuit arrangement of the present invention applied to such a three-phase star circuit type. This circuit arrangement is similar to the circuit arrangement shown in FIGURE 3, but there are three units I, II and III, each having the same elements as shown in FIGURE 3. The isolation diodes mentioned above are designated as diodes 15.

Thus, according to the present invention, the conduction cutoff phase angles of the individual rectifiers are registered sucessively wherein the last-measured value is registered by the registering member and stored therein until the next registering process is ended and a new output value is available. The registered output value not only serves as an indication of the conduction cutoff phase angle, but may also be used to regulate the phase angle of the rectifier. It should be noted, however, that the present invention is not limited to the registration of the conduction cutoff phase angle of a main fed inverter but can also be used for the registration of the length of any periodic interval of time.

For example, it is possible to register the rotating field angle of synchronous machines, either single or polyphase machines, according to the present invention. For registering this value, two reference points are chosen on the stator circumference of the synchronous machine and these reference points may be chosen at random. Switching means are provided for registering the zero crossing of the stator voltage at these reference points and additional switching means are provided at these reference points for registering the passing of the rotating field. Thus with reference to FIGURE 3, the switching means may serve as signal generators for the units I and II with the switching means for registering the stator voltage zero crossing at the two reference points serving, in the case of a synchronous motor, as the integration start signal generator for the activating input of the electronic switches present in such units. The switching means which registers the passing of the rotating field at the two reference points are connected as integration stop signal generators to the de-activating inputs of the corresponding electronic switches. In the case of a synchronous generator the switching means are reversed, that is, the switching means for registering the zero crossing of the stator voltage are connected as integration stop signal generators to the deactivating inputs of the electronic switches and the switching means for registering the passing of the rotating field are connected as integration start signal generators to the activating input of the electronic switches and the resultant registered value may be used to control the field angle of the synchronous machines.

The present invention may also be used for registering the electrical phase displacement angle of alternating values. For such use, switching means are provided as integration start and stop signal generators with the switching means not only registering the zero crossing of the alternating values but also registering whether these crossings are made from the positive to the negative or vice versa. Therefore, start and stop signal generators which register the zero crossings from positive to negative and generators which register the zero crossings from negative to positive are combined with each other. Such an arrangement makes it possible to register electrical phase displacement angles up to 180°. In the case of phase displacement angles which are greater than 180°, the connections of the integration start and stop signal generators and the corresponding electronic switch are reversed so that a measurement is no longer obtained of the displacement of alternating value A from alternating value B, but rather the displacement of the alternating value B from that of value A.

The present invention may also be used to register the torsion angle of rotating bodies by selecting two reference points on a common generatrix. In addition, switching means are provided at two selected fixed reference points on the rotation circle for the body and the switching means registering the passage of the two reference points on the rotating body with each point providing an integration start and stop signal, respectively. The generated signals are then fed to the two units of the circuit arrangement and register the torsion angle of the body. Also, the constant output signal from the source 4 is made dependent upon the number of rotations of the rotating body and this signal is then integrated by the two units of the circuit arrangement in the manner as described in connection with the registration of the conduction cutoff phase angle.

Thus, as indicated above the arrangement of the present invention may be used to register the duration of several successive periodic intervals of time in conjunction with a plurality of different devices and the registered value may be used further as a regulating signal for controlling the operation of the device.

It should be noted that each of the elements comprising the circuit of FIGURE 3 and FIGURE 4 is well known in the art and may, for example, include as the integration start and integration stop signal generators 1, 2, and as the switching device 5 a monostable trigger circuit (flip-flop). The switch 3 may include a bistable trigger circuit (flip-flop), the signal source 4 and the resetting device 6 may include a source which delivers a constant current. The integrator 7 may include a condenser and the registering member 9 may be a voltagemeter.

Descriptions of suitable inputs for the integration start and integration stop signal generators may be found, for example, in the magazines "Elektronik" 6 (1957), pages 307–308 or "Direct Current," February 1963, pages 50–56.

It will be understood that the above description of the present invention is susceptible to various modifications, changes, and adaptations, and the same are intended to be comprehended within the meaning and range of equivalents of the appended claims.

What is claimed is:

1. A device for providing an indication of the duration of each of several successive periodic time intervals, said device comprising, in combination:
   (a) control signal means responsive to the beginning of each such time interval for generating an integration start signal and responsive to the end of each such time interval for generating an integration stop signal;
   (b) at least two units each including an integrator having a first input for receiving a signal to be integrated, an output for storing the integrated signal and a resetting input for receiving a signal which resets said integrator output to zero, a source of a constant amplitude auxiliary signal whose output is connected to said integrator first input, first switching means connected for controlling the operation of said auxiliary signal source and having a first input connected to said control signal means for receiving integration start signals which turn said source on and a second input connected to said control signal means for receiving integration stop signals which turn said source off, second switching means having an input and an output, and resetting means connected between said second switching means output and said integrator resetting input for resetting said integrator output to zero when a signal is applied to said second switching means input, and a diode connected to said integrator output; and
   (c) registering means connected to said diodes of all of said units for receiving the signals appearing at the outputs of said integrators and registering the largest amplitude integrator output produced during each time interval, which is an indication of the duration of the time interval.

2. Circuit arrangement as defined in claim 1 wherein, for each of said units, said second switching means input is connected to said second input of said first switching means of the other said units for responding to the integration stop signal applied to any one of said other units to apply a resetting signal to said resetting means connected to the output of said second switching means.

3. Circuit arrangement as defined in claim 2 wherein said means for generating an integration start and an integration stop signal includes at least one integration start signal generator and at least one integration stop signal generator, said first input for said first switching means of each said unit being connected to one respective integration start signal generator and said second input for said switching means of each said unit being connected to at least one respective integration stop signal generator.

4. Circuit arrangement as defined in claim 3 wherein for registering the duration of an odd number $n$ of intervals of time per period, said circuit arrangement includes $n$ units, $n$ integration start signal generators and $n$ integration stop signal generators, each of said $n$ integration start signal generators being connected to the first input of said first switching means of a respective unit and each of said corresponding $n$ integration stop signal generators being connected to the second input of said first switching means of the same respective unit, and the input of said second switching means for each of said $n$ units being connected to the second input of said first switching means of the other units.

5. An arrangement as defined in claim 3 for providing an indication relative to an equal number of time intervals per period wherein only two units are provided and said control signal means provide the integration start and stop signals for one interval to one said unit and the integration start and stop signals for the next succeeding interval to the other said unit.

6. Circuit arrangement as defined in claim 1 wherein for registering the conduction cutoff phase angle of a main fed inverter, said control signal means are responsive to the zero crossing of the decaying rectifier current for producing each start signal and to the zero crossing of the positive going blocking voltage of the rectifier for producing each stop signal.

7. Circuit arrangement as defined in claim 6 wherein the signal registered by said registering means serves as an actual value signal for controlling the conduction cutoff phase angle of the rectifier.

8. Circuit arrangement as defined in claim 1 wherein for registering the conduction cutoff phase angle of a main fed inverter, said control signal means are responsive to the anode-cathode voltage of the rectifier as it becomes nonconductive for producing each start signal and to the zero crossing of the positive going blocking voltage of the rectifier for producing each stop signal.

9. Circuit arrangement as defined in claim 1 wherein for registering the rotating field angle of a synchronous motor, said control signal means are responsive to the zero crossing of the stator voltage of the motor at selected reference points about the stator circumference for producing each start signal and to the passing of the rotating field of the motor at such reference points for producing each stop signal.

10. Circuit arrangement as defined in claim 9 wherein the signal registered by said registering means serves as an actual value signal for controlling the rotating field angle.

11. Circuit arrangement as defined in claim 1 wherein for registering the rotating field angle of a synchronous generator, said control signal means are responsive to the zero crossing of the stator voltage of the generator at selected reference points about the stator circumference for producing each stop signal and to the passing of the rotating field of the synchronous generator at such reference points for producing each start signal.

12. Circuit arrangement as defined in claim 1 wherein for registering electrical phase displacement angles of different alternating values, said control signal means are responsive to the zero crossings of the different alternating values for producing the start and stop signals, respectively.

13. Circuit arrangement as defined in claim 1 wherein for registering the torsion angles of rotating bodies having fixed reference points thereon, said control signal means include an integration start signal generator and an integration stop signal generator positioned at fixed points on the rotation circle for the body, with each of said generators being responsive to the reference points on the body passing its position, and wherein the amplitude of the constant auxiliary signal is dependent upon the rotational speed of the rotating body.

References Cited

UNITED STATES PATENTS

| | | | |
|---|---|---|---|
| 2,599,586 | 6/1952 | Ross | 324—68 |
| 2,699,529 | 1/1955 | Wenk et al. | 324—68 |
| 3,201,690 | 8/1965 | Embree et al. | 324—158 |
| 3,250,990 | 5/1966 | Hubbs et al. | 324—158 X |

RUDOLPH V. ROLINEC, *Primary Examiner.*

P. F. WILLE, *Assistant Examiner.*